United States Patent
Abbott et al.

(10) Patent No.: US 6,246,203 B1
(45) Date of Patent: Jun. 12, 2001

(54) DIRECT SKEW CONTROL AND INTERLOCK OF GANTRY

(75) Inventors: Rexford Abbott; Son Phi, both of San Jose, CA (US)

(73) Assignee: Silicon Valley Group, Inc., San Jose, CA (US)

( * ) Notice: Subject to any disclaimer, the term of this patent is extended or adjusted under 35 U.S.C. 154(b) by 0 days.

(21) Appl. No.: 09/245,445

(22) Filed: Feb. 5, 1999

(51) Int. Cl.[7] .................................................. B64C 17/06
(52) U.S. Cl. .................... 318/649; 318/625; 318/568.22; 414/936
(58) Field of Search ............................ 105/103; 318/38, 318/46, 35, 649, 625, 568.12, 568.11, 568.22, 632, 648; 414/935, 936, 940

(56) References Cited

U.S. PATENT DOCUMENTS

| | | | | |
|---|---|---|---|---|
| 3,204,577 | * | 9/1965 | Smith | 105/163 |
| 4,505,207 | * | 3/1985 | Bagaric et al. | 105/163 |
| 4,629,955 | * | 12/1986 | French et al. | 318/625 |
| 4,667,834 | * | 5/1987 | Lanigan et al. | 212/159 |
| 4,679,332 | * | 7/1987 | Luthi | 33/559 |
| 5,040,927 | * | 8/1991 | Wickberg | 405/232 |
| 6,048,655 | * | 4/2000 | Nakahara | 414/936 |
| 6,157,159 | * | 12/2000 | Korenaga et al. | 318/649 |
| 6,160,338 | * | 12/2000 | Ono | 414/936 |
| 6,164,894 | * | 12/2000 | Cheng | 414/936 |

* cited by examiner

*Primary Examiner*—David Martin
(74) *Attorney, Agent, or Firm*—Van Mahamedi; Wilson Sonsini Goodrich & Rosati

(57) ABSTRACT

Systems and methods are described for direct skew control and interlock of a gantry. An apparatus includes a gantry that includes a first member defining a gantry primary axis Z, a cross member defining a secondary axis X that is coupled to the first member via a trunnion, and a second member defining a gantry primary axis Z' coupled to the cross member via an elastic hinge. A method for controlling skew on a cross member moved by a first and second driver includes moving the first and second drivers to a first position, measuring a resulting skew value, and correcting the skew on the cross member by moving the first driver and/or the second driver.

46 Claims, 8 Drawing Sheets

DIRECT SKEW CONTROL AND INTERLOCK OF GANTRY

BACKGROUND OF THE INVENTION

1. Field of the Invention

The invention relates generally to the field of gantry positioning systems. More particularly, the invention relates to controlling and detecting skew in a gantry positioning system for semiconductor wafer transfer applications.

2. Discussion of the Related Art

Gantries in general face considerations resulting from dynamic or unbalanced loads that are transported across or along axes of the gantry. In applications related to silicon wafer fabrication processes, gantries are sometimes required to position robots that transport wafers between modules for performing fabrication steps on wafers. The robots serve to position wafers to a high degree of precision. For instance, robots are used to precisely position wafers within cassettes so as to place the wafers three pins or more pins. If the robot is even slightly misaligned, the robot may fail to transfer or place the wafer. However, the weight of the robot may also cause skew to develop on the gantry that affects alignment and ability to precisely position the wafers. In the worst case, skew may damage the robot or components on the gantry. Therefore, semiconductor wafer transfer gantries in particular face control problems arising in part from skew and misalignment.

As practiced in the known art, the control of gantry positioning systems is limited to using direct drive coupled systems that are unable to compensate for skew. For example, the known art provides for a gantry having gantry axes directly coupled together by a T gear box and/or miter gearbox. Such directly coupled gantries of the known art cannot compensate for deflections and misalignments due to dynamically driven loads. What is needed, therefore, is an approach to compensating for skew in a gantry.

SUMMARY OF THE INVENTION

An object of this invention is to detect and control skew on a gantry system having a variable load on a secondary (X) axis.

Another object of the invention is to provide a gantry having the ability to "hard interlock" differential motion with a mechanical assembly.

Another object of the invention is to provide a gantry with a mechanical fuse that powers off a controller to the gantry when excessive skew is detected.

In accordance with these goals, there is a particular need for providing a gantry with a trunnion engaged with a sensor adapted to detect skew. There is also a need to detect and compensate for skew appearing on a secondary axis of a gantry as the gantry is operated. And there is a need to provide a mechanical fuse that can shut down the system when skew is deemed excessive.

A first aspect of the invention is implemented in an embodiment that is based on an apparatus that comprises a gantry. The gantry includes a first member defining a gantry primary axis Z, a cross member defining a secondary axis X coupled to the first member and a second member defining a gantry primary axis Z' coupled to the cross member via an elastic hinge. The cross member includes a trunnion that permits angular, radial, or lateral displacement of at least a portion of the cross member. An elastic hinge opposing the trunnion across the cross member may also allow for corresponding radial displacement.

A second aspect of the invention is implemented in an embodiment that is based on n apparatus that comprises a gantry. The gantry includes first member defining a gantry primary axis Z, a cross member defining a secondary axis X coupled to said first member, and a second member defining a gantry primary axis Z' coupled to said cross member. The ross member includes a sensor adapted to measure a dimension representing skew of the cross member. The dimension can be controlled.

A third aspect of the invention is provided by an apparatus comprising a gantry which includes a first member defining a gantry primary axis Z, a cross member defining a secondary axis X coupled to the first member, and a second member defining a gantry primary axis Z' coupled to the cross member. The gantry further includes a mechanical fuse adapted to detect excessive skew.

A fourth aspect of the invention is provided by a method for controlling skew on a cross member being moved by a first and second driver. The method comprises moving the first and second drivers to a first position, measuring a resulting skew value, and correcting the skew on the cross member by moving the first and/or the second driver.

A fifth aspect of the invention is provided by a method for controlling skew on a cross member of a gantry, the cross member being moved by a first and second driver, where the method comprises performing a homing sequence to determine a home position for the first driver, and aligning the second driver to be substantially parallel with the first driver. The method further comprises moving the first and second drivers to a first position, then measuring a resulting skew value, and then correcting the skew on the cross member by moving the first and/or the second driver, if necessary.

These, and other, goals and aspects of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters (if they occur in more than one view) designate the same parts. It should be noted that the features illustrated in the drawings are not necessarily drawn to scale.

DESCRIPTION OF PREFERRED EMBODIMENTS

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The term coupled, as used herein, is defined as connected, although not necessarily directly, and not necessarily mechanically. The term substantially, as used herein, is defined as approximately equal to (e.g. within 10%, preferably within 1.0%, more preferably within 0.1%).

Figure 1:
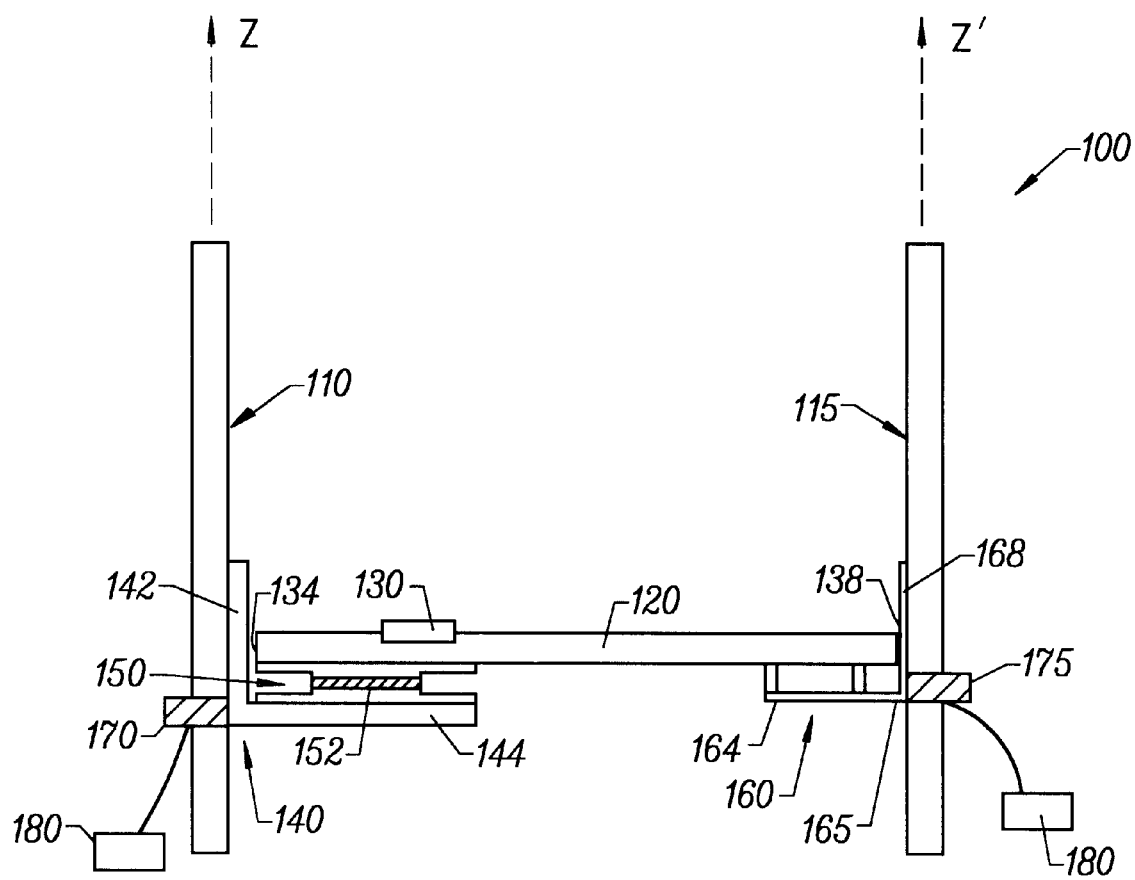
FIG. 1 a schematic view of a gantry representing an embodiment of the invention.

FIG. 1 illustrates a gantry 100 incorporating concepts of this invention. The gantry may be used to position wafer fabrication robots, preferably along a vertical or horizontal axis. In an application of the invention, the gantry 100 may be used to position a wafer fabrication robot in a fabrication plant incorporating stacks of cassettes for storing wafers, and modules that perform steps in the process of fabricating wafers. The gantry 100 is adapted to detect and compensate for skew resulting from a vertical force applied to a carriage 130 from, for example, the weight of a robot head, and/or load carried by the robot head. The skew may result from one or more of several factors, such as (1) power failures disproportionately affecting one of the vertical members; (2) off-center loading of a carriage with respect to the cross member; (3) initial misalignment between the first and second end of the cross member at start-up; and (4) failure of one of the drivers that position the cross member in the Z-direction.

The gantry 100 is preferably formed of a first vertical member 110 aligned in a first primary axis Z, and a second vertical member 115 aligned in a second primary axis Z' that is substantially parallel to the first primary axis Z. A cross member 120 is aligned along a secondary axis X that is substantially perpendicular to the Z, Z' axes. The cross member 120 includes a first end 134 that is moveably coupled to the first vertical member 110, and a second end 138 that is moveably coupled to the second vertical member 115. A first driver 170 couples to the first vertical member 110 to move the cross member 120 in the Z direction from the first end 134. Similarly, a second driver 175 couples to the second vertical member 115 to power the cross member 120 in the Z' direction from the second end 138. For this invention, a driver may encompass mechanisms for propelling the cross members 120 from the first or second ends 134, 138, such as for example an AC motor, a DC motor, a stepper motor, a linear motor, a worm gear, or a fluid cylinder.

The carriage 130 for transporting a wafer handling robot is slidably coupled to the cross member 120. In this manner, the carriage 130 may be moved within a vertical distance defined by the first and second vertical members 110 and 115, and within a horizontal distance defined by the length of the cross member 120. A control unit 180 couples to one or both of the drivers 170, 175. As will be described in FIG. 5, the control unit 180 may be a combination of a motion controller coupled to a host computer. The control unit 180 performs functions for homing, skew correction or compensation, and provides command positions to one or both of the drivers to position the cross member on the Z, Z' axes.

With further reference to FIG. 1, a rigid end bracket 140 moveably couples to the first vertical member 110. The rigid end bracket 140 includes a mounting segment 142 that is slidably coupled to the first vertical member 110, and a support segment 144 that extends horizontally towards the second vertical member 115. A trunnion 150 secures to the support segment 144 and couples to the cross member 120. When skew is present on the cross member 120, the trunnion 150 pivots about a pivot axis 152. The trunnion 150 may be dimensioned to provide a control gap (see FIG. 3) in which the trunnion pivots when the cross member is skewed. As will be further described, when skew is detected, the controller 180 and one or both of the drivers 170, 175 may combine in operation to compensate and correct for the skew by positioning one, or both, of the ends of the cross member 120 with respect to the Z, Z' axes.

The second vertical member 115 includes a flex end bracket 160 that is moveably coupled to move in the Z' axis. The flex end bracket 160 includes a mounting segment 168 that slidably couples to the second vertical member 115, and a support segment 164 that supports the second end 138 of the cross member 120. The second end 138 of the cross member 120 couples to the flex end bracket 160 via an elastic hinge 165. The elastic hinge 165 allows for resilient skew tolerances, as well as linear errors arising from factors such as thermal expansion, at the second end 138 of the cross member 120.

Figure 2:
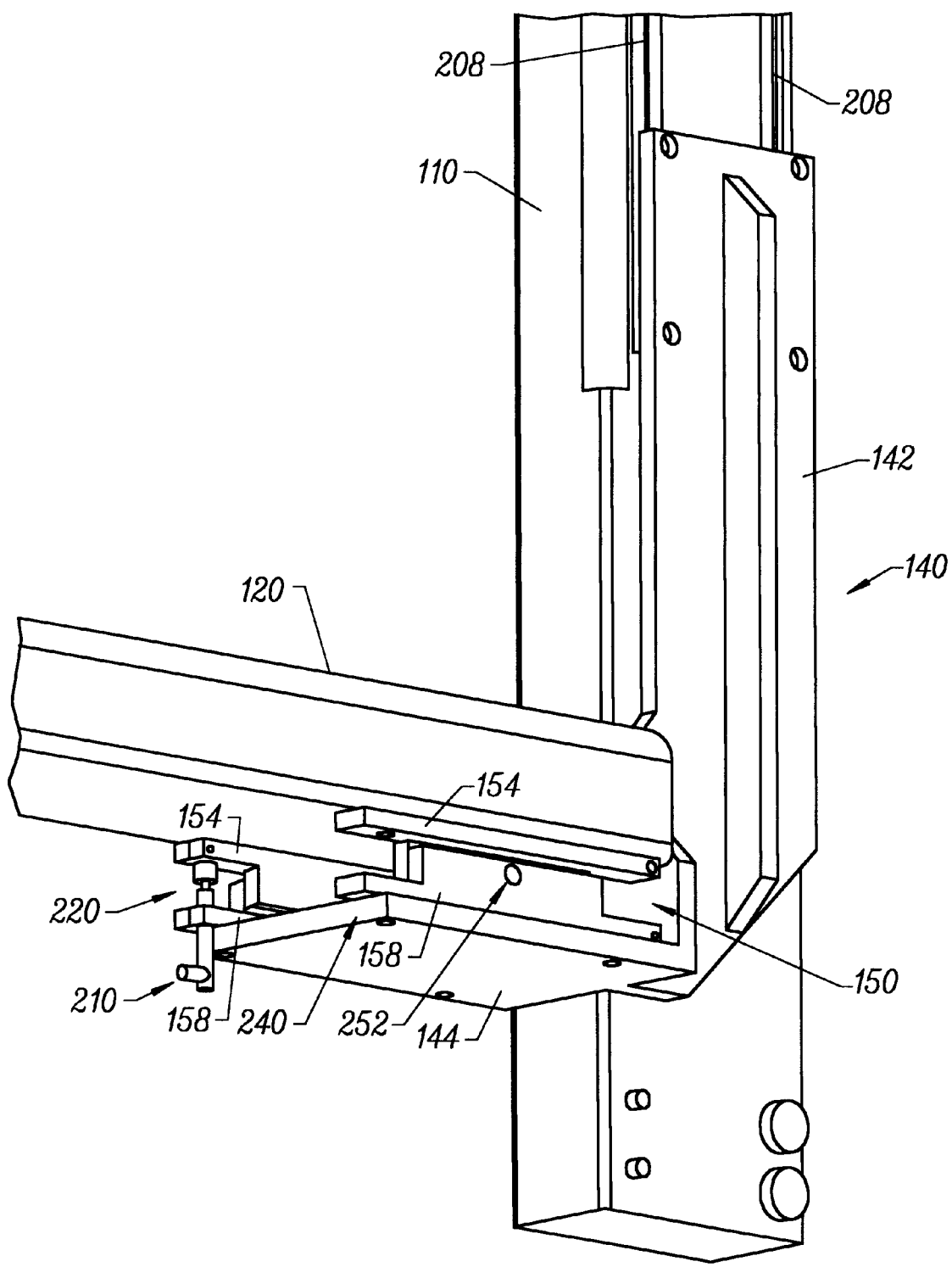
FIG. 2 is a bottom isometric view of a portion of the gantry shown in FIG. 1 representing an embodiment of the invention.

With reference to FIG. 2, the mounting segment 142 engages with a track assembly 205 on the first vertical member 110 so that the first end 134 of the cross member 120 is slidable on the Z-axis. A driver 170 (FIG. 1) may couple to or be integrated with the rigid end bracket 140 so as to move the rigid end bracket 140 along the first vertical member 110. Preferably, the first vertical member 110 includes sensor codes 208 such as linear encoded markings that are dispersed evenly along the length of the first vertical member 110. A sensor (not shown), such as optical or magnetic sensors known in the art, is provided on the mounting segment 142 to detect the sensor codes on the first vertical member 110. A feedback from the sensor to the controller 180 provides the position of the first end 134 on the Z-axis.

Similarly, the second vertical member 115 may include a track assembly (not shown) and linear encoding so that the second end 138 of the cross member is slidable in the Z' axis. A sensor (not shown) employed on the mounting segment 168 of the flex end bracket 160 (see FIG. 1) may then detect the sensory codes on the second vertical member 115 and provide a position feedback of the second end 138 with respect to the Z'-axis.

With further reference to FIG. 2, the trunnion 150 may include a first pivot structure 220, and a second pivot structure 240 opposing the first pivot structure in parallel. The first and second pivot structures 220, 240 are each provided with laterally adjoining and vertically offset top and bottom segments 154 and 158, with the first pivot structure 220 coupled to a skew sensor 210. The top and bottom segments 154 and 158 combine to provide each of the respective pivot structure 220, 240 with a clockwise and counterclockwise freedom about the pivot point 252. The first pivot structure 220 of the trunnion 150 may be configured so that the bottom segment 158 secures to the support segment 144 of the rigid end bracket 140, and the top segment 154 secures to the cross member 120. In this configuration, the top segment 158 may pivot in either direction depending on the type of skew present on the cross member 120. The skew sensor 210 is engaged to detect the magnitude and/or direction of the skew on the cross member 120 when the trunnion 150 pivots.

Figure 3:
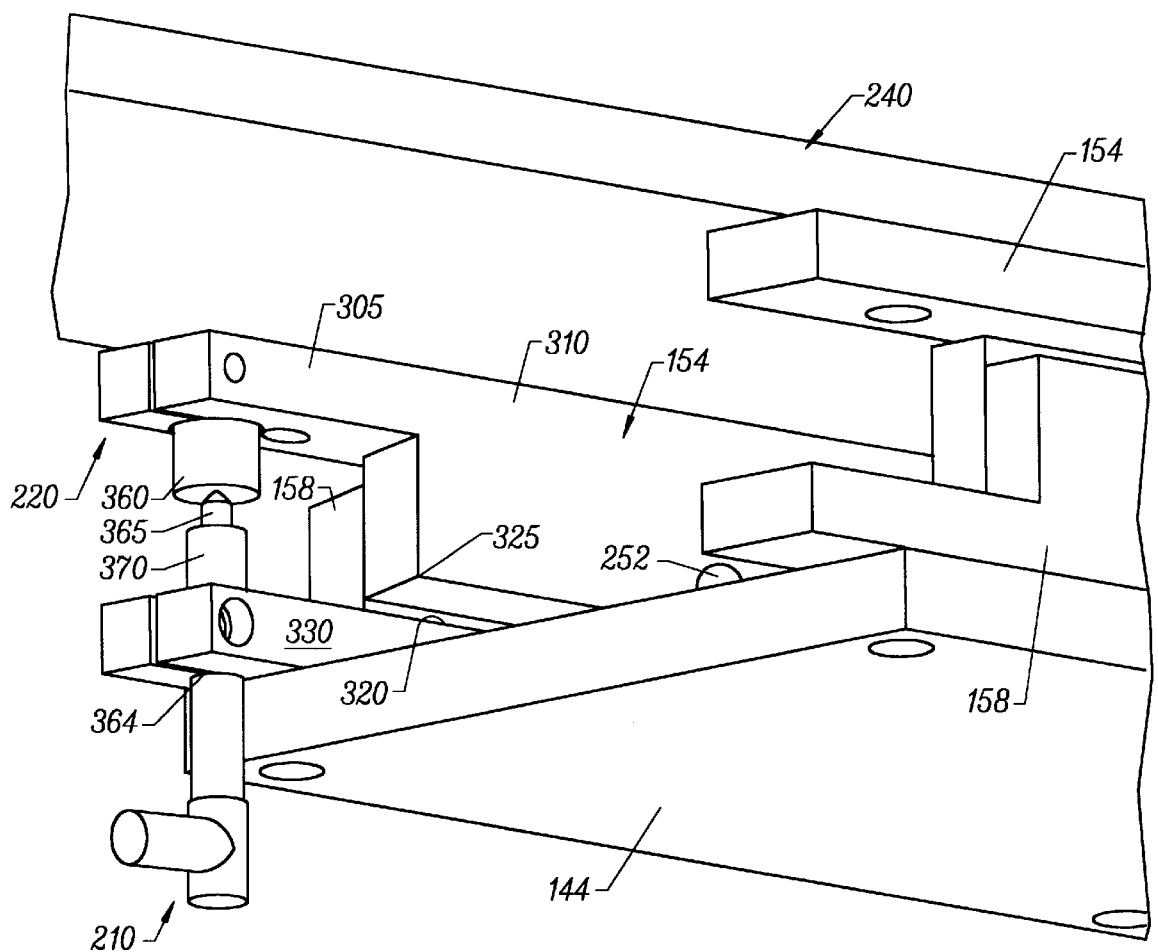
FIG. 3 is a close-up of a portion of FIG. 2, detailing a skew sensor, representing an embodiment of the invention.

FIG. 3 details the trunnion 150 of FIG. 2, including the skew sensor on the cross member 120. Preferably, the trunnion 150 includes two pivot points 252 defining a single pivot axis. The first and second pivot structures 220 and 240 are similar, with the first pivot structure 220 adapted to receive the skew sensor 210. The top segment 154 of the first pivot structure 220 includes a top extension 305 secured to the cross member 120, and a medial portion 310 extending from a portion of the top extension 305 towards the support segment 144. A control gap 320 may be provided between the medial portion 310 of the top segment 154 and the support ledge 144. The control gap 320 defines a maximum range of motion allowed for the pivot motion of the top segment 154. In this way, the support ledge 144 provides a "hardstop" to limit the range of motion for the trunnion 150 in a first direction.

The bottom segment 158 is adjacent to and pivotally connected with the top segment 154 via the pivot point 252. Preferably the bottom segment 158 secures to the support segment 144, and includes a bottom extension 330 aligned with and substantially parallel to the top extension 305. A bottom medial portion extends from the bottom extension 330 towards the cross member 120. The top and bottom extensions 305 and 330 may include aligned openings that are dimensioned to receive the skew sensor 210. Another control gap (not clearly shown in FIG. 3) may be provided between the medial portion 335 of the bottom segment 158 and the support control member 120. The control gap of the bottom segment provides another hardstop to limit the motion of the trunnion 150 in a second direction.

FIG. 3 shows that an embodiment of the invention provides for the trunnion 150 to detect skew on the cross member 120 in either angular direction. As will be discussed in greater detail below, skew may be compensated for by repositioning the first and/or second ends 134 and 138 of the cross member 120 on the respective Z, Z' axis in a manner that allows the cross member 120 to be orthogonally aligned. Referencing FIG. 3, a downward skew on the Z' axis of the cross member 120 will cause the top segment 154 of both pivot structures 220, 240 to pivot counter-clockwise. Similarly, an upward skew on the Z axis of the cross member 120 will cause the top segment 154 to pivot clockwise. The skew sensor 210 is shown engaged with the first pivot structure 220 to detect the magnitude of the skew based on the motion of the top segment 154 with respect to the bottom segment 158, or support segment 144.

The skew sensor 210 may determine the magnitude of the skew in either direction by measuring the relative positions of the top segment 154 and the bottom segment 158. The skew sensor 210 is preferably a differential motion transducer (analog or digital) such as a linear voltage transducer differentiator (LVTD) or magnetically encoded transducer. Such linear voltage transducer differentiators are readily commercially available from manufacturers such as Sony. The skew sensor 210, may in the embodiment shown by FIGS. 2 and 3, include a magnetic coil 360 that is coupled to the top base 220, or alternatively to the cross member 120. A cylinder portion of the skew sensor 210 slidably engages with the bottom segment 158 through an opening 364. The magnetic coil 360 may be directed vertically by the top segment 154 to engage a rod 365 extending from a transducer body 370. As shown by FIG. 3, the rod 365 moves downward within the coil 370 when skew lowers the first end 134 of the cross member with respect to the second end 138. Likewise, the rod 365 moves upward within the coil 370 when the skew on the cross member raises the first end 134 with respect to the second end 138. The motion of the rod within the coil either forces a current or pulse quantity that is representative of the magnitude and direction of the skew on the cross member 120.

While the embodiment of FIGS. 1–3 illustrates the trunnion 150 to have two pivot structures 220, 240, it should be readily apparent to one skilled in the art that one or more pivot structures, or other similar trunnions and structures may be used to detect the skew on the cross member 120. Similarly, while the embodiment of FIGS. 1–3 illustrates the cross member 120 coupled to the second vertical member 115 via the elastic hinge 165, it should be readily apparent to one skilled in the art that the hinge may be rigid with respect to the Z prime and X axes. If the pivot structures 220 and 240 are free to move laterally with respect to the X axis.

Figure 4:
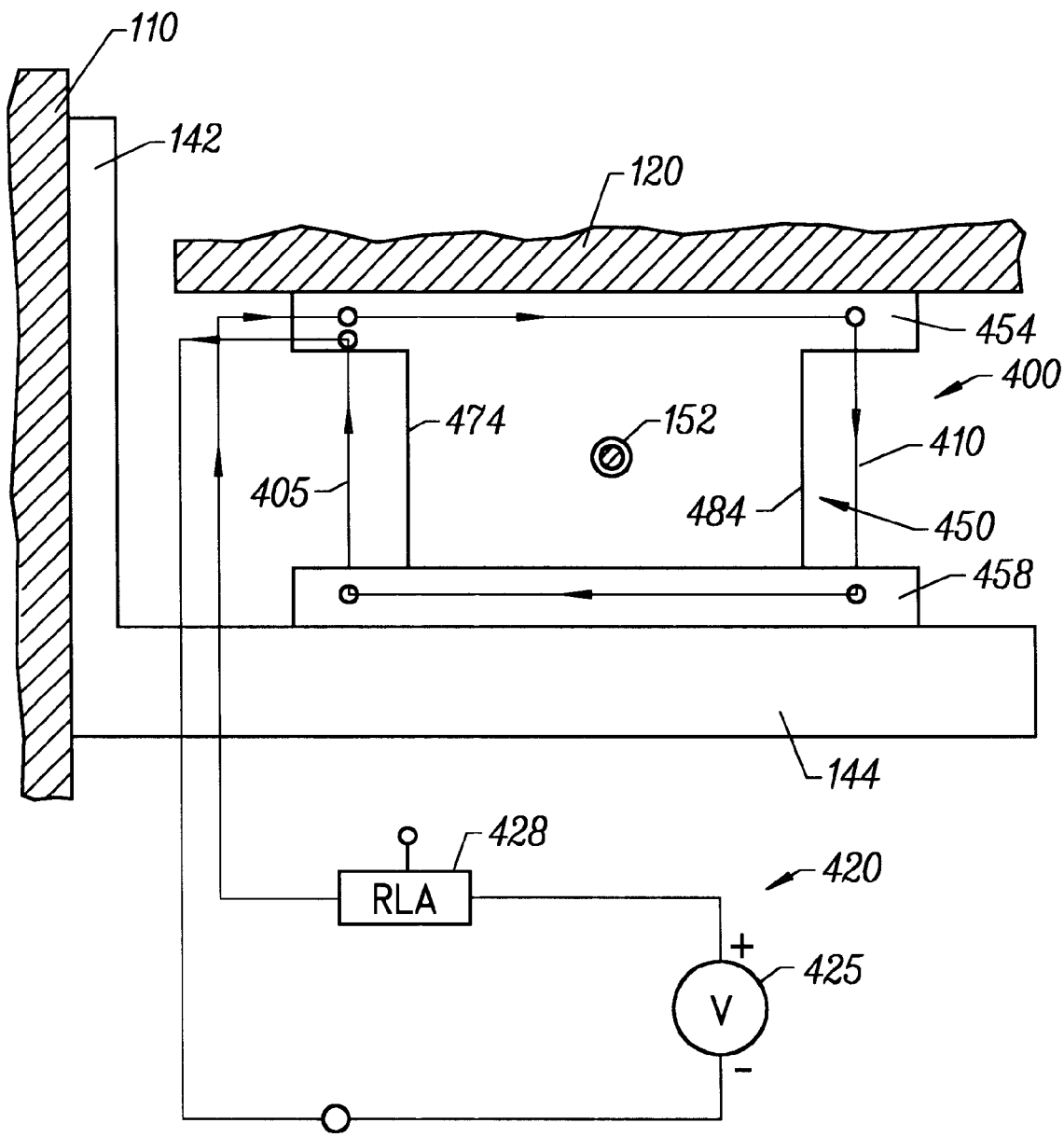
FIG. 4 is a schematic view of a trunnion having an integrated mechanical fuse for detecting excessive skew, representing an embodiment of the invention.

FIG. 4 shows an embodiment of the invention in which a mechanical fuse 400 is integrated with the trunnion 450 to preclude excessive skew from damaging the components of the gantry. When excessive skew is present on the cross member 120, fracture of the fuse 400 will result and may actuate an interlock with the controller 180 (shown in FIG. 1) to stop the drivers 170, 175 so that the gantry will not be damaged by further movement of the cross member 120. Preferably, the fuse 400 may include a closed loop of brittle wire that integrates between a top and bottom extension 454 and 458 of the trunnion 450. The closed loop may include a first breaker section 405 and a second breaker section 410, in which the wire may be made taut or otherwise dimensioned to break when skew on the cross member 120 exceeds a certain amount. For reference, the first breaker section 405 includes a vertical length extending from the top extension 454 to the bottom extension 458 on a proximal side 474 to the first vertical member 110. The second breaker section 410 includes a vertical length extending from the top extension 454 to the bottom extension 458 on a distal side 484 to the first vertical member 110. When a downward skew is present on the cross member 120, the top section 454 will rotate in a counter-clockwise direction. If the downward skew is excessive, the first breaker section 405 will break, thereby cutting power to the gantry and precluding further movement of the cross member 120. When an upward skew is present on the cross member 120, the top extension 454 of the trunnion 450 will pivot in a clockwise direction. If the upward skew is excessive, the second breaker section 410 will break to actuate interlock and preclude further motion of the cross member 120. A circuit 420 incorporating the fuse for interlocking the gantry includes a voltage source 425 coupled to a relay 428 for effectuating the interlock.

Figure 5A:
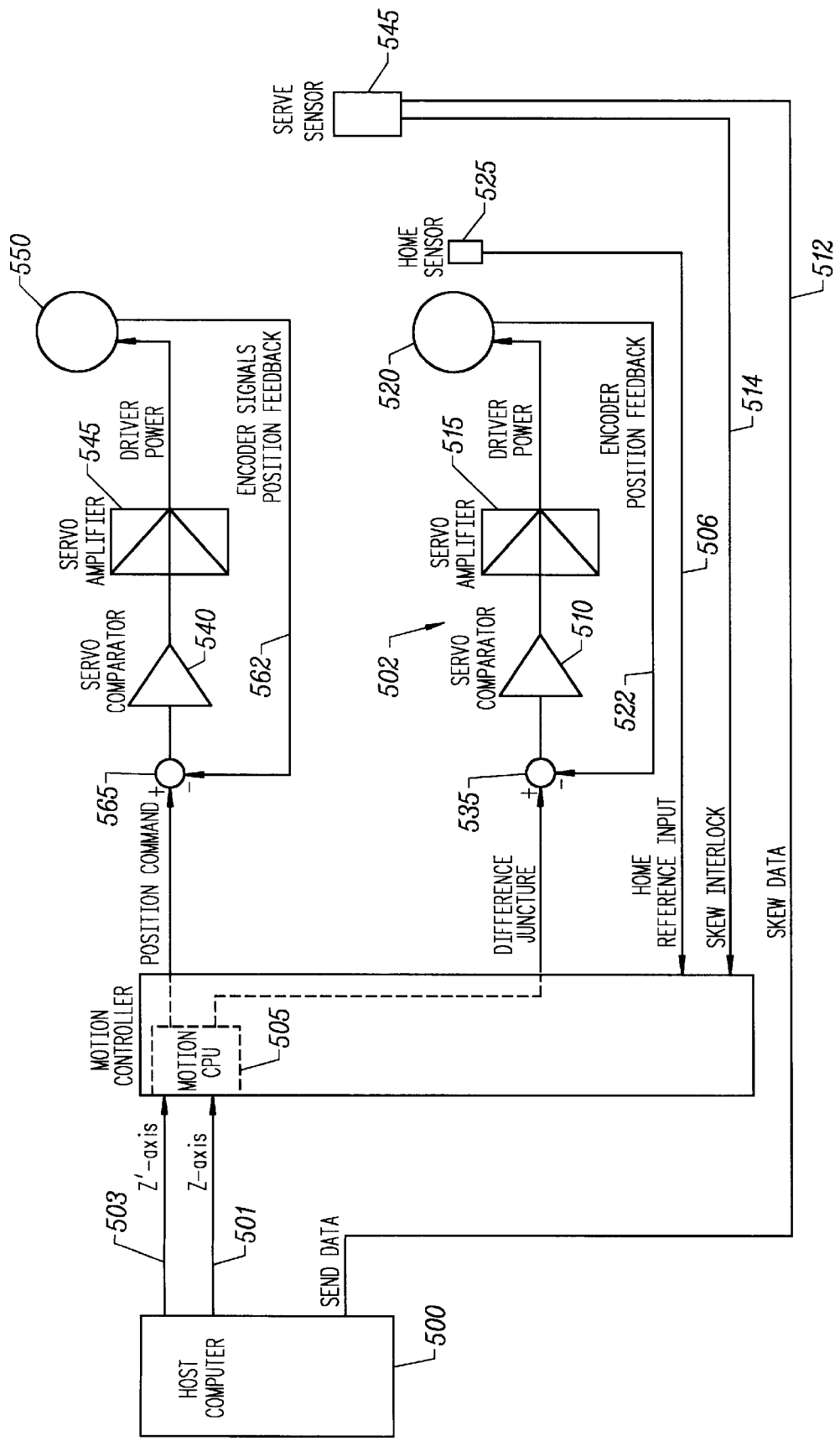
FIGS. 5A–5B illustrate logic diagrams for control of gantry axis Z and gantry axis Z', representing an embodiment of the invention.

FIG. 5A illustrates an embodiment of a logic schematic for compensating or correcting skew according to a master-master relationship between a first driver 520 and a second driver 550. In a first control loop 502, a host computer 500 couples to and controls the first driver 520 to direct the first end 134 of the cross member 120 along the Z-axis. Similarly, in a second control loop 504, the host computer 500 couples to and controls the second driver 550 to direct the second end 138 of the cross member 120 along the Z'-axis. The control for the first driver 520 includes a home sensor 525 that couples to a motion controller 505 via home reference input line 506. As will be discussed in greater detail below, the home sensor 525 interfaces with a sensor or sensory codes on either vertical member 110, 115 in order to determine a home position for the cross member 120. The home position may be determined during an initial homing sequence initiated by the host computer 500 and/or motion controller 505, as detailed in FIGS. 6 and 7. Referring again to FIG. 5A, the host computer 500 provides command data to the motion controller 505, once the homing sequence is performed. Preferably, the command data is separately carried to the motion controller 505 via Z and Z' axis data lines 501 and 503. The motion controller 505 then independently provides first command signals 508 and 509 to the first control loop 502 and the second control loop 504. The first command signals 508, 509 correspond to a coordinate on the Z, Z'-axes that is a selected distance from the home position of the cross member 120.

In the first control loop 502, a comparator 510 receives the command position signal. An amplifier 515 couples to the comparator 510 and provides a power signal to the first driver 520, which in turn positions the first end 134 of the cross member 120 on the Z-axis at the coordinate corresponding to the command position. The first driver 520 may couple to a sensor (not shown) for reading sensory codes such as linear encoding on the first vertical member 110. Linear encoding may be used in an embodiment to provide an encoder position feedback 522, which may be passed through a difference juncture 535 for measuring a difference between the command position and the encoder position. The encoder position feedback 522 then signals the motion controller 505 to stop the first driver 520 at the first command position. A skew sensor 545 communicates with the host computer 500 to provide skew data via the skew data line 512. The skew sensor 545 may include one or more LVTD's or other differential motion transducers (analog or digital). The skew sensor 545 also couples to the trunnion 450 to provide the motion controller 505 with skew interlock data via line 514. The skew interlock data may be provided by the closed loop integrated with the trunnion 150, as described with FIG. 4. Preferably, the skew interlock data may signal at any time to the motion controller 505 to shut-down further movement of the cross member 120 once the skew exceeds allowable tolerances.

In the second control loop 504, the motion controller 505 provides a second position command to a comparator 540 in the second control loop 504. An amplifier 545 couples to the comparator 540 and provides a power signal to the second driver 550, which in turn controls the positioning of the second end 138 along the Z' axis. As with the first control loop 502, linear encoding may be used in an embodiment to provide an encoder position feedback 562. The encoder position feedback 562 may be passed through a difference juncture 565 for measuring a difference between the command position and the encoder position of the second driver 550. The encoder position feedback 562 then signals to stop the second driver 550 at the first command position.

When the cross member 120 is in a resting position, such as the home or command position, the host computer 500 receives the skew data and signals one or more subsequent command signals to the motion controller 505 to correct for the skew of the cross member 120. To correct for skew, the host computer 500 may provide only one command signal to move one of the drivers, or the host computer 500 may provide two signals to move both of the drivers in opposite directions. In this way, a master-master arrangement provides for skew correction by moving either or both first and second ends 134, 138 of the cross member 120.

Figure 5B:
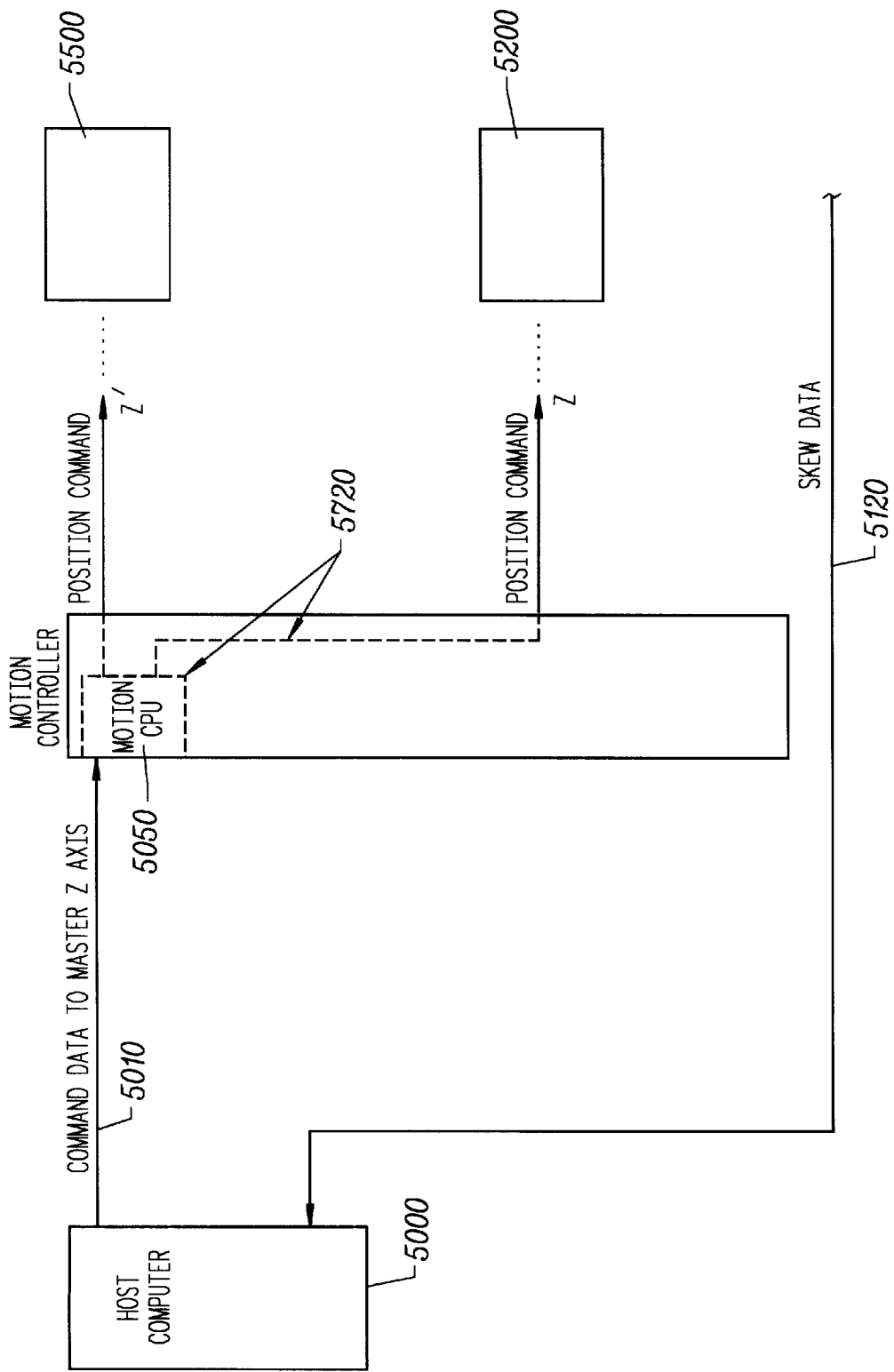

FIG. 5B illustrates an alternative embodiment for compensating or correcting skew according to a master-slave relationship between a first driver 5200 and a second driver 5500. In this embodiment, the host computer 5000 communicates with the first driver 5200 as the master. The first driver 5200 then communicates with the second driver 5500 as the slave. Accordingly, the motion controller 5050 receives command position data for only the first driver 5200 via line 5010. The motion controller 5050 then signals a position command to the first driver 5500. The first driver 5200 includes a feedback 5720, which repeats the command position to the motion controller 5050. The motion controller 5050 then signals the command position to the second driver 5500.

Preferably, the remaining portion of the circuit for controlling the first driver 5200 and second driver 5500 is identical to the embodiment of FIG. 5A. Either one of the drivers may include a home sensor for determining the home position of the cross member 120 when the drivers are in the master-slave relationship. Similarly, either one of the drivers may include a skew sensor for providing skew data to the host computer 5000, as well as a skew interlock signal to the motion controller 5050. The host computer 5000 corrects for skew on the cross member 120 by controlling only the master or first driver 5200. After the cross member is moved to the command position, the host computer 5000 receives the skew data from the skew sensor line 5120. The host computer then provides a command signal that moves the first driver 5200 in either direction on the Z-axis.

In the master-slave arrangement, the closed loop between the drivers causes the horizontal alignment of the cross member 120 to remain constant as the cross member 120 is moved from the home position to the command position. Therefore, the cross member 120 may be transported in a static skewed state until the cross member reaches the command position. This may be disadvantageous in comparison to the master-master system, where the host computer positions each driver independently and thereby avoids constant alignment of the cross member 120 during its transportation. In addition, since the second driver 5500 must first receive its signal from the first driver 5200, a time delay may exists between the start of the first driver 5200 and the arrival of the second driver 5500 at the command position. The time delay may cause further skew on the master-slave system during the transportation of the cross member 120 to the command position due to intervening events. Therefore, the master-master system is preferred in applications where skew tolerance is low.

Referring again to FIG. 5A, this invention also provides for correction of misalignments resulting from errors in positioning either end of the cross member at the selected position. For example, the feedback position of the first driver 520 and/or the second driver 550 may be affected by noise and error that affects the interface between the linear encoder surface and the sensor. The encoder position provided by the sensor interfacing with the linear encoder is then rendered erroneous, which in turn affects the positioning of the first or second driver 520, 550. Since any misalignment may be detected by the skew sensor, the skew sensor also ensures against positioning errors resulting from sensor error or noise.

Figure 6:
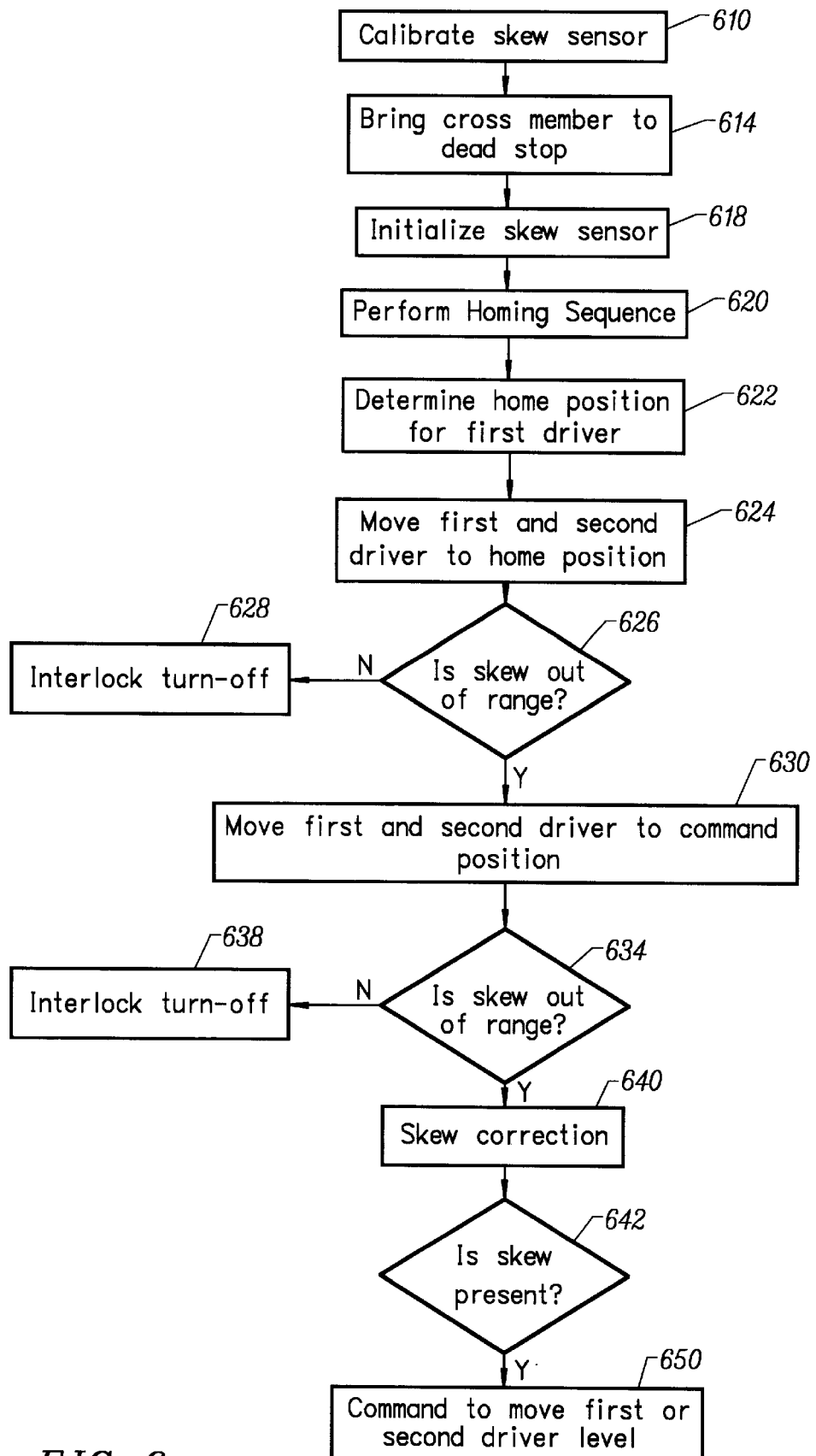
FIG. 6 is a flow chart detailing a method for detecting and correcting skew, representing an embodiment of the invention.

FIG. 6 illustrates one preferred method according to the above embodiments in which the host computer 500 positions the cross member 120. In step 610, the skew sensor is calibrated to a zero skew value beginning at step 610. Calibration includes moving the cross member 120 to a dead-stop position in step 614. The dead-stop position corresponds to placing the cross member on a floor surface of the gantry 100, where the cross member 120 has zero skew. Therefore, in step 618, the skew sensor may be initialized with the cross member having zero skew.

In step 620, a homing sequence is performed on one of the drivers as will be described in greater detail with reference to FIG. 7. As described in greater detail with FIG. 7, the homing sequence seeks to locate a home position for the cross member 120 that serves as a reference coordinate by which the host computer 500 may address subsequent command positions. Referring again to FIG. 6, step 622 shows that host computer preferably determines a home position for only the first driver 520. Then, step 624 provides that the first and second drivers 520 and 550 move the cross member to the home position located for the first driver 520. At the home position, step 626 checks for excessive skew on the cross member 120, preferably by use of a mechanical fuse that is integrated with the trunnion 150, as shown in FIG. 4. If the skew is excessive, the mechanical fuse preferably signals to the host computer 500 an interlock turn-off, as shown by step 628. Preferably, in interlock turnoff, the host computer 500 is either turned-off or signaled to turn-off the motion controller 505. This is preferably accomplished by the circuit 420 of FIG. 4, which may signal a skew interlock 514 (FIG. 5A) from which the mechanical fuse stops the first and second drivers 520 and 550 from further movement.

Referring again to FIG. 6, from the home position, the host computer provides the command signal in step 630 to move the first and second drivers 520 and 550 to the command position. Excess skew is once again checked for in step 634, preferably by the mechanical fuse, in which case another interlock turn-off may be signaled to the host computer in step 638.

Without interlock turn-off, the skew is detected and corrected in step 640. In an embodiment such as described by FIGS. 2–4, skew detection is accomplished by a skew sensor that engages with a trunnion 150. If skew is present, and within a tolerance range in which interlock turn-off is not required, the host computer 500 provides one or more subsequent command signals in step 650 to correct for the detected skew. In the master-master arrangement of FIG. 5A, a subsequent command signal may move either one or both the drivers 520, 550 so that the cross member 120 is aligned to be perpendicular with the Z and Z'-axes.

While some embodiments of the invention provide for correcting skew after the cross member 120 is moved, alternative embodiments may provide for skew correction while the cross member 120 is in motion. In such alternative embodiments, the skew sensor continually senses the skew of the cross member 120. Any skew detected is signaled to the host computer 500, which then signals to the motion controller 505 to make adjustments to either the first or second driver "on the fly" while the cross member 120 is moving to the command position. This alternative may minimize the presence of skew on the cross member 120 and ensure that the cross member is substantially aligned while being moved to the command position. However, to perform "on the fly" skew detection and correction requires feedback between the drivers, motion controller 505, and the host computer 500 that is sufficiently complex to require non-serial communications.

Still other variations of this invention provide for detecting skew after the cross member is moved to a first command position, then correcting for skew when the cross member 120 is provided a second command position from the first command position. In this embodiment, the skew correction follows detection of the skew generated on the cross member 120 in moving to its previous position. This may provide satisfactory results if the gantry is allotted sufficient tolerances for the amount of skew that may be present in any one command position.

Figure 7:
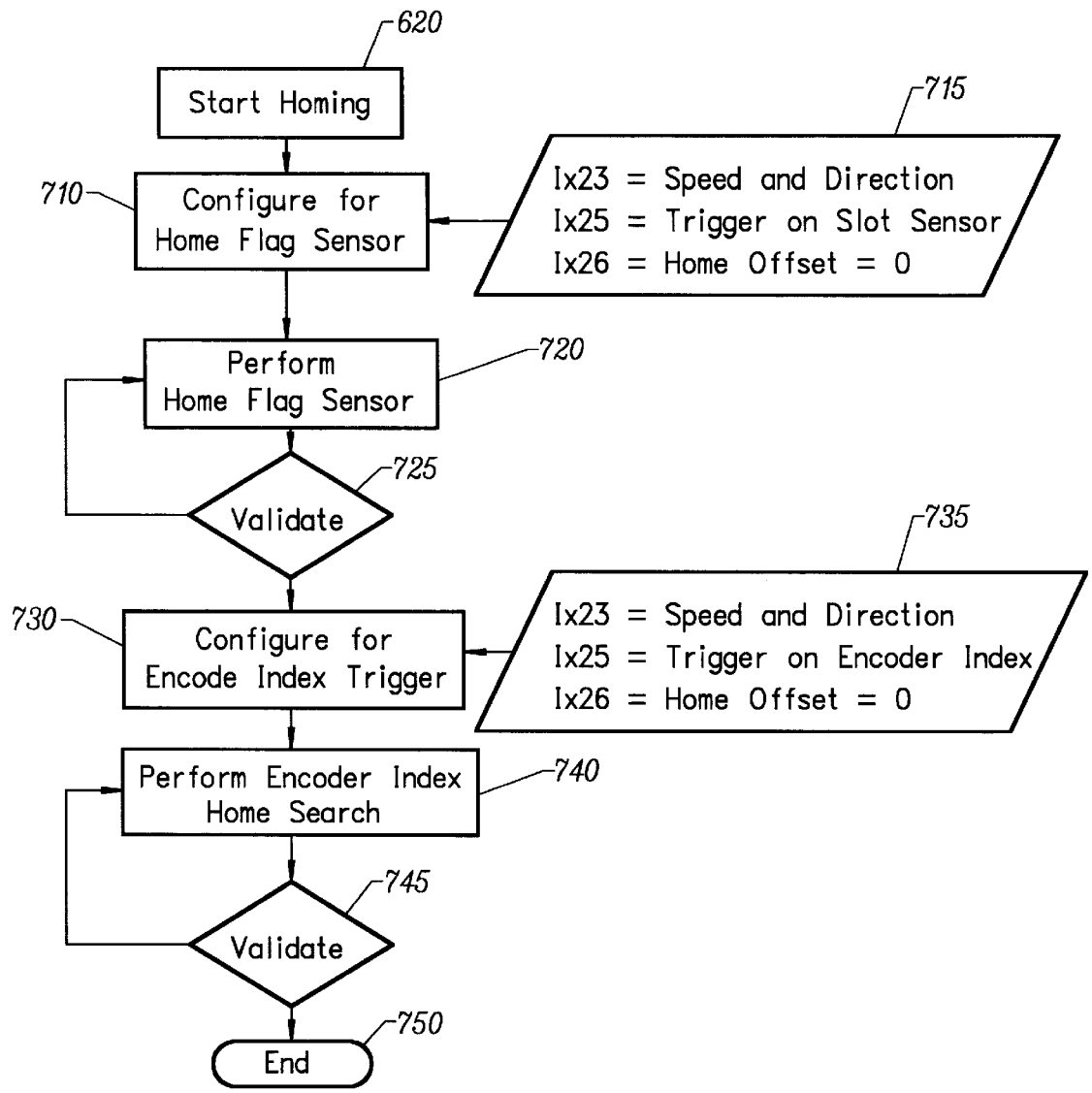
FIG. 7 is a flow chart detailing a homing sequence for locating a home position for the cross member, representing an embodiment of the invention.

FIG. 7 provides an exemplary algorithm for performing a homing sequence on the host computer 500 for one or both of the drivers 520, 550. Preferably, a home flag sensor is mounted or associated with a predesignated position on the first vertical member 110. In alternative variations and embodiments, the homing flag sensor may additionally be provided on the second vertical member 115. Once the home flag position is found, the algorithm searches for the nearest encoder index.

With reference to FIG. 7, the algorithm starts homing in step 620 (see FIG. 6) at the first end 134 of the cross member 120. In step 710, the host computer 500 is configured in a home flag sensor mode. In step 715, configuration data is inputted to configure the host computer, the home flag sensor is turned on, and a home offset variable is set to zero. This data may include variables that account for the speed and the direction of the respective first or second driver. In step 720, the host computer searches for the home flag sensor on the corresponding vertical axis member 110, 115. The location of the home flag sensor is then validated in step 725, preferably by repeating the step 720. This may correspond to moving the first or second driver in the Z or Z' direction one or more times past the home flag sensor, and then lowering the driver to locate the home flag again.

In step 730, the host computer 500 is configured in an encoder index trigger mode. In step 735, configuration of the host computer is accomplished by inputting data such as speed and direction of the respective driver in the Z or Z' direction. The linear encoding sensor may also be triggered on in this step, and the home offset variable may be set to zero. In step 740, a search is performed for the nearest encoder index of the linear encoder sensor. The encoder index found in this step corresponds to the home position designated for the respective first or second driver. In an embodiment, the nearest encoder in step 740 is found by "typing" each axis. In typing, a diagnostic check is run to determine a nominal distance between the home flag sensor and the index located as being nearest. The index must fall within a specified tolerance in its position from the home flag sensor before the index is assigned as the home position. Step 745 then validates step 740 trough repetition, and the homing sequence is signaled as finished in step 750.

This invention provides a cost-effective gantry and system for ensuring precision movements of gantry members. In semiconductor applications, this invention allows for the use of gantries, which have previously been limited because of problems associated with skew. By better enabling the uses of gantries, this application facilitates speed and cost of wafer fabrication. In particular, advantages of this application include providing a direct drive system using uncoupled drivers. The gantry configuration compensates for skew arising during its operation while ensuring excessive skew will not damage the gantry or semiconductor equipment being employed with the gantry.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plusfunction limitations, unless such a limitation is explicitly recited in a given claim using the phrase "means-for." Expedient embodiments of the invention are differentiated by the appended subclaims.

What is claimed is:

1. An apparatus for positioning a wafer fabrication robot, the apparatus composing:
   a first member defining a primary axis Z, and a second member defining a primary axis Z';
   a cross member defining a secondary axis X, the cross member being moveably coupled to the first member via a trunnion, and the cross member being moveably coupled to the second member via an elastic hinge; and
   a first driver slidably coupled to the first member and to a first end of the cross member to move the cross member along the primary axis Z;
   second driver slidably coupled to the second member and to a second end of the cross member to move the cross member along the primary axis Z';
   a carriage for carrying the wafer fabrication robot, the carriage being slidably coupled to the cross member to move along the secondary axis X; and
   a control unit that detects a skew affecting the wafer fabrication robot and adjusts a position of at least the first driver or the second driver to compensate for the skew.

2. The apparatus of claim 1, wherein the trunnion is adapted to pivot when the cross member is skewed so as to affect of the wafer fabrication robot.

3. The apparatus of claim 2, wherein a bracket slidably couples to the first member and includes a support ledge that extends below the cross member, and the trunnion includes a bottom segment secured to the support ledge and a top segment secured to the cross member.

4. The apparatus of claim 3, further comprising a sensor engaged with the trunnion to detect the skew.

5. The apparatus of claim 4, wherein the trunnion includes a top segment that pivots with respect to a bottom segment to engage the sensor upon the cross member forming the skewed.

6. The apparatus of claim 4, wherein the sensor is a linear voltage transducer differential.

7. The apparatus of claim 4, wherein the bracket slidably couples to the first member, and the first driver couples to position the bracket along the first member.

8. The apparatus of claim 1, wherein the trunnion includes two pivot points and a single pivot axis.

9. An apparatus for positioning a wafer fabrication robot, the apparatus comprising:
   a first member defining a gantry primary axis Z;
   a cross member defining a secondary axis X coupled to said first member via a trunnion;
   a second member defining a gantry primary axis Z' coupled to said cross member via an elastic hinge;
   a sensor engaged with the trunnion to detect the skew on the cross member;
   a bracket slidably coupled to the first member;
   a first driver coupled to position the bracket along the first member; and
   wherein the sensor includes a ferrite core secured to a bottom segment of the trunnion, the bottom segment being secured to a support ledge of the bracket extending below the cross member, and wherein the sensor includes a coil secured to the cross member and aligned to receive an extension of the ferrite core once the cross member becoming skewed.

10. An apparatus for positioning a wafer fabrication robot, the apparatus comprising:
    a first member defining a primary axis Z, and a second member defining a primary axis Z';
    a cross member defining a secondary axis X, the cross member being moveably coupled to the first member and to the second member, the cross member being pivotally coupled to the first member to be pivotal in a first direction and in a second direction along the first primary axis Z; and
    a carriage slidably coupled to the cross member for carrying the wafer fabrication robot; wherein said cross member includes a sensor adapted to measure a dimension representing skew of said cross member affecting the wafer fabrication robot.

11. The apparatus of claim 10, wherein the first member is coupled to the cross member via a trunnion, and wherein the trunnion is adapted to pivot when the cross member is skewed.

12. The apparatus of claim 11, wherein a bracket slidably couples to the first member and includes a support ledge that extends below the cross member, and the trunnion includes a bottom segment secured to the support ledge and a top segment secured to the cross member.

13. The apparatus of claim 12, wherein the bracket slidably couples to the first member, and a first driver couples to positions the bracket along the first member.

14. The apparatus of claim 11, wherein the trunnion includes two pivot points and a single pivot axis.

15. The apparatus of claim 10, wherein the sensor is a linear voltage transducer differential.

16. An apparatus for positioning a wafer fabrication robot, the apparatus comprising:
    a first member defining a primary axis Z, and a second member defining a primary axis Z';
    a cross member defining a secondary axis X moveably coupled to said first member via a trunnion and moveable coupled to said second member to move along the primary axis Z and the primary axis Z';
    a carriage slidably coupled to the cross member for carrying the wafer fabrication robot along the secondary axis Z; and
    a mechanical fuse coupled to said cross member and adapted to detect excessive skew of said cross member.

17. The apparatus of claim 16, wherein the mechanical fuse may be triggered to electrically cut-off movement of the cross member.

18. The apparatus of claim 17, wherein the first member is coupled to the cross member via a trunnion, and wherein the trunnion is adapted to pivot when the cross member is skewed.

19. The apparatus of claim 18, wherein a bracket slidably couples to the first member and includes a support ledge that extends below the cross member, and the trunnion includes a bottom segment secured to the support ledge and a top segment secured to the cross member.

20. The apparatus of claim 19, wherein the mechanical fuse includes a closed wire circuit having a first breaker section extending vertically between the top segment and bottom segment of the trunnion, the first breaker section being coupled to the trunnion so as to break when the trunnion pivots in a first direction.

21. The apparatus of claim 19, wherein the closed wire circuit includes a second breaker section extending vertically between the top segment and bottom segment of the trunnion, the second breaker section being coupled to the trunnion so as to break when the trunnion pivots in a second direction.

22. The apparatus of claim 18, wherein the mechanical fuse is coupled to the trunnion, and the mechanical fuse breaks when skew on the cross member causes the trunnion to pivot a certain amount.

23. A method for controlling skew on a cross member of a gantry moved by a first and second driver, the gantry being used to position a wafer fabrication robot that is slidably coupled to the cross member, the method comprising:

moving the first and second drivers until the first driver is detected to be at a first position for engaging the wafer fabrication robot;

measuring a resulting skew value affecting the wafer fabrication robot; and correcting the skew on the cross member by moving the second driver.

24. The method of claim 23, wherein moving the first and second drivers includes signaling the first driver a first command position from a host computer, and signaling the second driver the first command position from the host computer.

25. The method of claim 23, wherein moving the first and second drivers includes signaling the first driver a first command position from a host computer, and signaling the second driver the first command position from the first driver.

26. The method of claim 25, wherein correcting the skew on the cross member includes moving only the second driver.

27. The method of claim 23, wherein the step of measuring a resulting skew is performed prior to the step of moving the first and second drivers from the first position to a second position.

28. The method of claim 23, wherein the step of measuring the resulting skew includes engaging a skew sensor with a trunnion, wherein the trunnion is pivotably coupled to the cross member so as to pivot when the cross member is skewed.

29. The method of claim 28, wherein the skew sensor is a differential motion transducer.

30. The method of claim 28, wherein the skew sensor is a linear voltage transducer differentiator.

31. The method of claim 23, wherein the step of moving the first and second drivers includes providing a position feedback of the respective first and second drivers to the host computer.

32. The method of claim 23, including the additional steps of detecting for excessive skew, and then stopping the first and second drivers.

33. The method of claim 32, wherein detecting for excessive skew includes integrating a mechanical fuse into a trunnion, the trunnion being pivotably coupled to the cross member so as to pivot when the cross member is skewed, wherein the mechanical fuse is adapted to break when the pivot of the trunnion exceeds a certain amount.

34. A method of controlling skew on a cross member of a gantry being used for positioning a wafer manufacturing robot, the gantry being moved by a first and second driver, the method comprising:

a) performing a homing sequence to determine a home position for the first driver, and aligning the second driver to be substantially parallel with the first driver; then b) moving the first and second drivers to a first position; then c) measuring a resulting skew value using a skew sensor positioned within a trunnion; and then d) correcting the skew on the cross member by moving at least one of the first drivers and the second driver.

35. The method of claim 34, wherein the step of measuring a resulting skew value includes providing a skew sensor in engagement with the cross member.

36. The method of claim 35, including a step of calibrating the skew sensor prior to performing a homing sequence.

37. The method of claim 36, wherein calibrating the skew sensor includes bringing the cross member to a dead stop on a surface that precludes skew from being present.

38. The method of claim 37, wherein the step of performing a homing sequence includes locating a predetermined home position for the first driver.

39. The method of claim 38, wherein the step of initiating a homing sequence includes locating a sensory index immediately adjacent to the predetermined home position by moving the first driver.

40. The method of claim 39, wherein locating a sensory index immediately adjacent to the predetermined home position includes determining a nominal range from the home position in which the immediately adjacent index may exist.

41. The method of claim 40, wherein the step of measuring a resulting skew value includes using a linear voltage transducer differential.

42. The method of claim 36, wherein measuring a resulting skew value includes securing an end of the trunnion to a cross member, the trunnion being pivotable when the cross member is skewed, and then engaging the skew sensor with a trunnion to detect the pivot of the trunnion.

43. The method of claim 35, wherein the step of moving the first and second drivers includes independently signaling a command position to the first driver and to the second driver, wherein the command position corresponds to the first position.

44. The method of claim 34, wherein the step of moving the first and second drivers includes signaling the first driver a command position corresponding to the first position.

45. The method of claim 34, wherein the step of correcting skew on the cross member includes signaling a motion controller coupled to the first driver, then signaling from the first driver to the second driver the command position, wherein the command position corresponds to the first position.

46. An apparatus for positioning wafer fabrication robot, the apparatus comprising:

a first member defining a gantry primary axis Z;

a second member defining a gantry primary axis Z' coupled to the cross member, a cross member defining a secondary axis X coupled to the first member;

a bracket slidably couples to the first member and including a support ledge that extends below the cross member, a trunnion that couples the cross member to the first member, the trunnion being adapted to pivot when the cross member is skewed; and a sensor provided on the cross member to measure a dimension representing skew of the cross member, the sensor including a ferrite core secured to a bottom segment of the trunnion, the bottom segment being secured to a support ledge of the bracket extending below the cross member, the sensor including a coil secured to the cross member and aligned to receive the ferrite core upon the cross member becoming skewed.

* * * * *